United States Patent
Kanakarajan (10) Patent No.: US 10,389,575 B2
(45) Date of Patent: Aug. 20, 2019

(54) TRAFFIC MIGRATION BASED ON TRAFFIC FLOW AND TRAFFIC PATH CHARACTERISTICS

(71) Applicant: Juniper Networks, Inc., Sunnyvale, CA (US)

(72) Inventor: Ravindranath C. Kanakarajan, Bangalore (IN)

(73) Assignee: Juniper Networks, Inc., Sunnyvale, CA (US)

( * ) Notice: Subject to any disclaimer, the term of this patent is extended or adjusted under 35 U.S.C. 154(b) by 60 days.

(21) Appl. No.: 15/655,496

(22) Filed: Jul. 20, 2017

(65) Prior Publication Data

US 2019/0028329 A1    Jan. 24, 2019

(51) Int. Cl.
| | |
|---|---|
| H04L 12/26 | (2006.01) |
| H04L 12/24 | (2006.01) |
| H04L 12/28 | (2006.01) |
| H04L 12/801 | (2013.01) |
| H04L 29/08 | (2006.01) |
| H04L 12/851 | (2013.01) |

(52) U.S. Cl.
CPC ...... H04L 41/0668 (2013.01); H04L 12/2856 (2013.01); H04L 47/12 (2013.01); H04L 43/0876 (2013.01); H04L 43/16 (2013.01); H04L 47/24 (2013.01); H04L 67/10 (2013.01)

(58) Field of Classification Search
CPC ....... H04L 45/24; H04L 47/125; H04L 47/12; H04L 45/04; H04L 45/12; H04L 45/123; H04L 45/00; H04L 45/02; H04L 45/22; H04L 41/12; H04L 47/10; H04L 47/24
See application file for complete search history.

(56) References Cited

U.S. PATENT DOCUMENTS

| | | | |
|---|---|---|---|
| 8,953,590 B1 * | 2/2015 | Aggarwal | H04L 12/4675 370/389 |
| 2003/0161338 A1 * | 8/2003 | Ng | H04L 45/00 370/437 |
| 2009/0022056 A1 * | 1/2009 | Ninan | H04L 43/0882 370/238 |
| 2009/0204320 A1 * | 8/2009 | Shaffer | G01C 21/3415 701/533 |
| 2014/0181267 A1 | 6/2014 | Wadkins et al. | |
| 2015/0124622 A1 | 5/2015 | Kovvali et al. | |
| 2016/0043944 A1 | 2/2016 | Felstaine et al. | |
| 2016/0150421 A1 | 5/2016 | Li et al. | |

OTHER PUBLICATIONS

European Search Report corresponding to EP 18180540.9 dated Dec. 7, 2018, 10 pages.

* cited by examiner

*Primary Examiner* — Sai Aung
(74) *Attorney, Agent, or Firm* — Harrity & Harrity, LLP (57) ABSTRACT

A device may include one or more processors to detect an issue in a universal customer premises equipment (uCPE) platform; select a traffic flow to migrate from the uCPE platform to a virtual customer premises equipment (vCPE) platform, the traffic flow may be selected based on a characteristic of the traffic flow; determine a traffic path of the traffic flow through the vCPE platform; select a point of presence (PoP) of the vCPE platform to host a virtual network function (VNF) associated with the traffic flow based on the PoP being situated along the traffic path; and perform an action associated with the PoP or the traffic flow to resolve the issue.

20 Claims, 8 Drawing Sheets

TRAFFIC MIGRATION BASED ON TRAFFIC FLOW AND TRAFFIC PATH CHARACTERISTICS

BACKGROUND

Network function virtualization (NFV) is a network architecture concept that virtualizes classes of network node functions into building blocks that may connect, or chain together, to create communication services. NFV platforms may be distributed, centralized, or a hybrid of distributed and centralized. Distributed NFV (or on-site NFV) is a platform that utilizes universal customer premises equipment (uCPE), while centralized NFV (or cloud-based NFV) is a platform that utilizes virtual customer premises equipment (vCPE).

An NFV architecture may include virtual network functions (VNFs) which are software implementations of network functions. A VNF may consist of one or more virtual machines running different software and/or processes, on top of standard high-volume servers, switches and/or storage devices, rather than having custom or dedicated hardware appliances for each network function.

SUMMARY

According to some implementations, a device may include one or more processors to detect an issue in a universal customer premises equipment (uCPE) platform; select a traffic flow to migrate from the uCPE platform to a virtual customer premises equipment (vCPE) platform, the traffic flow may be selected based on a characteristic of the traffic flow; determine a traffic path of the traffic flow through the vCPE platform; select a point of presence (PoP) of the vCPE platform to host a virtual network function (VNF) associated with the traffic flow based on the PoP being situated along the traffic path; and perform an action associated with the PoP or the traffic flow to resolve the issue.

According to some implementations, a non-transitory computer-readable medium may store instructions, the instructions may include one or more instructions that, when executed by one or more processors, may cause the one or more processors to detect an issue in a universal customer premises equipment (uCPE) platform; select a traffic flow to cloudburst from the uCPE platform to a virtual customer premises equipment (vCPE) platform, the traffic flow may be selected based on a characteristic of the traffic flow; determine a traffic path of the traffic flow through a plurality of points-of-presence (PoPs) of the vCPE platform; select a PoP from the plurality of PoPs to host a virtual network function (VNF) associated with the traffic flow; and perform an action associated with the PoP or the traffic flow to resolve the issue.

According to some implementations, a method may include detecting, by a device, an issue in a universal customer premises equipment (uCPE) platform; selecting, by the device, a traffic flow of a virtual network function (VNF) of the uCPE platform to migrate to a virtual customer premises equipment (vCPE) platform, the traffic flow may be selected based on a characteristic of the traffic flow; determining, by the device, a traffic path of the traffic flow from the uCPE platform, through the vCPE platform, and to a destination; selecting, by the device, a point of presence (PoP) of the vCPE platform to host a VNF corresponding to the VNF of the uCPE platform to handle the traffic flow, the PoP may be selected based on the PoP being situated along the traffic path; and performing, by the device, an action associated with the PoP or the traffic flow to resolve the issue.

DETAILED DESCRIPTION

The following detailed description of example implementations refers to the accompanying drawings. The same reference numbers in different drawings may identify the same or similar elements.

An ability to scale a network with network function virtualization (NFV) capability enables activation/deactivation of network resources and/or virtual network functions (VNFs) to meet the needs of the network (e.g., process/perform VNFs), while maintaining performance without wasting costs. Additionally, a network with active-active high availability (HA) may ensure that the network continues to operate despite certain resources becoming unavailable (e.g., due to failure, shutdown, disconnection from a network, etc.). However, while, in many instances, scaling and HA may be implemented in centralized NFV platforms when using a virtualized customer premises equipment (vCPE) platform (e.g., in centralized NFV), scaling and HA may not be able to be implemented within a universal customer premises equipment (uCPE) platform (distributed NFV) due to limited resources of on-site equipment (e.g., there may only be a fixed amount of devices to implemented the uCPE). While it may be possible for uCPE platforms to achieve scaling and/or HA through migrating traffic to a vCPE platform (which may be referred to herein as a "cloudburst" or the act of "cloudbursting"), this may result in overloading a resource of the vCPE platform. For example, overloading a particular vCPE resource may occur because the vCPE resource may be a designated backup for the failed uCPE platform that is already overloaded or becomes overloaded with additional traffic of the uCPE platform.

Some implementations herein enable migrating appropriate traffic flows of uCPE platforms to appropriate resources of vCPE platforms. For example, traffic flows of applications may be selected for migration based on characteristics of the traffic flows and/or characteristics of the corresponding applications of the traffic flows, such as an application's service level agreement (SLA), a priority of an application, a destination path for traffic flow of an application, and/or the like. As another example, a particular resource, such as a point of presence (PoP) of a vCPE platform, may be selected for migration based on characteristics of the PoP, including a destination (e.g., a physical location, a logical location within a topology of a network, etc.) of the traffic, a utilization or load of the PoP, a cost of migrating a traffic flow from the uCPE to the PoP (e.g., a cost corresponding to time, resources, or the like needed to migrate the traffic flow), and/or the like. Therefore, according to some implementations herein, a selection process may be implemented when migrating traffic from a uCPE platform to a vCPE platform that avoids overloading resources of a vCPE platform while achieving scaling and/or HA for the uCPE platform. Accordingly, failures, shutdowns, errors, or the like may be avoided within a uCPE platform and/or a vCPE platform.

Figure 1A:
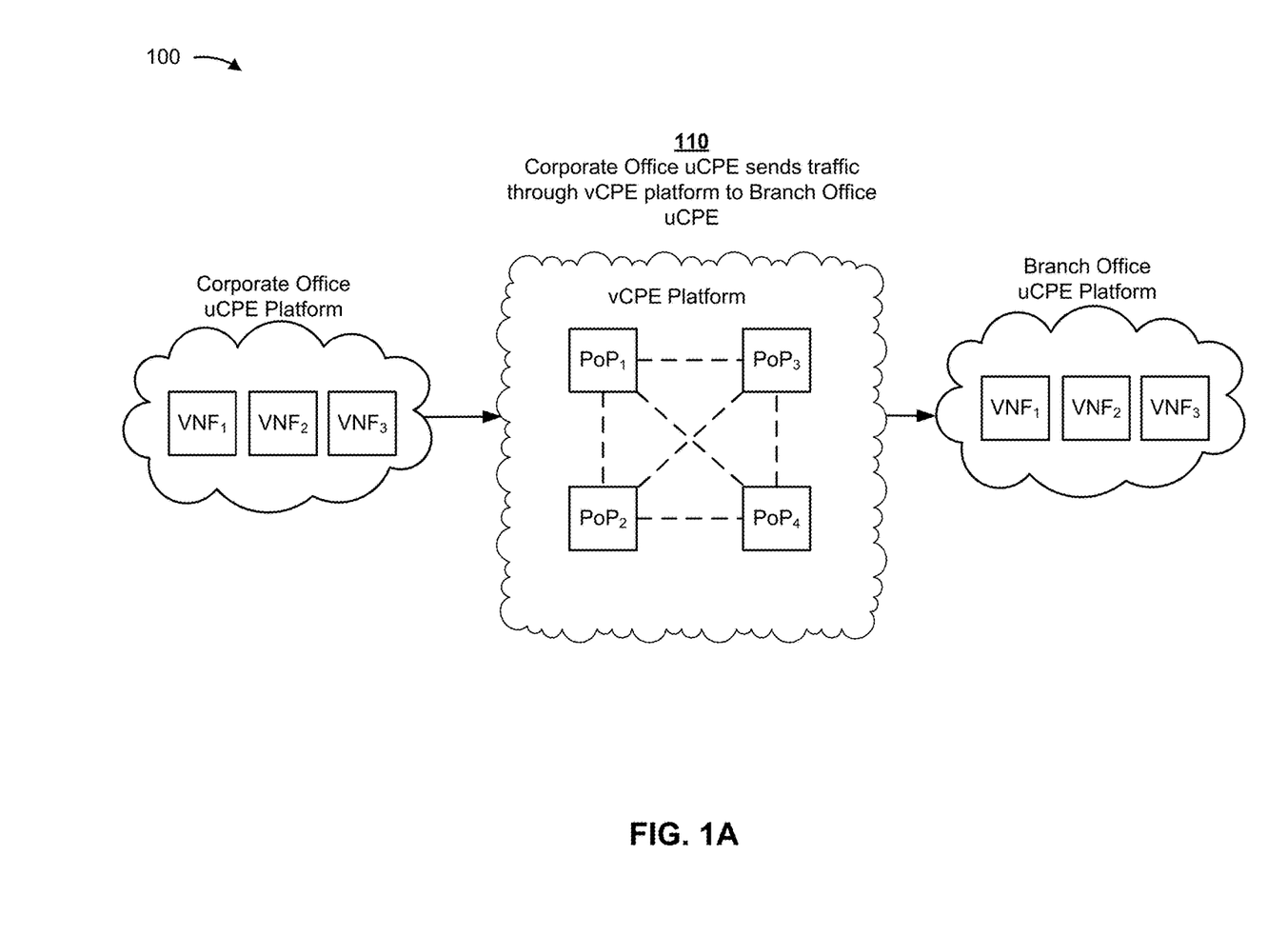
FIGS. 1A-1C are diagrams of an overview of an example implementation described herein.
Figure 1B:
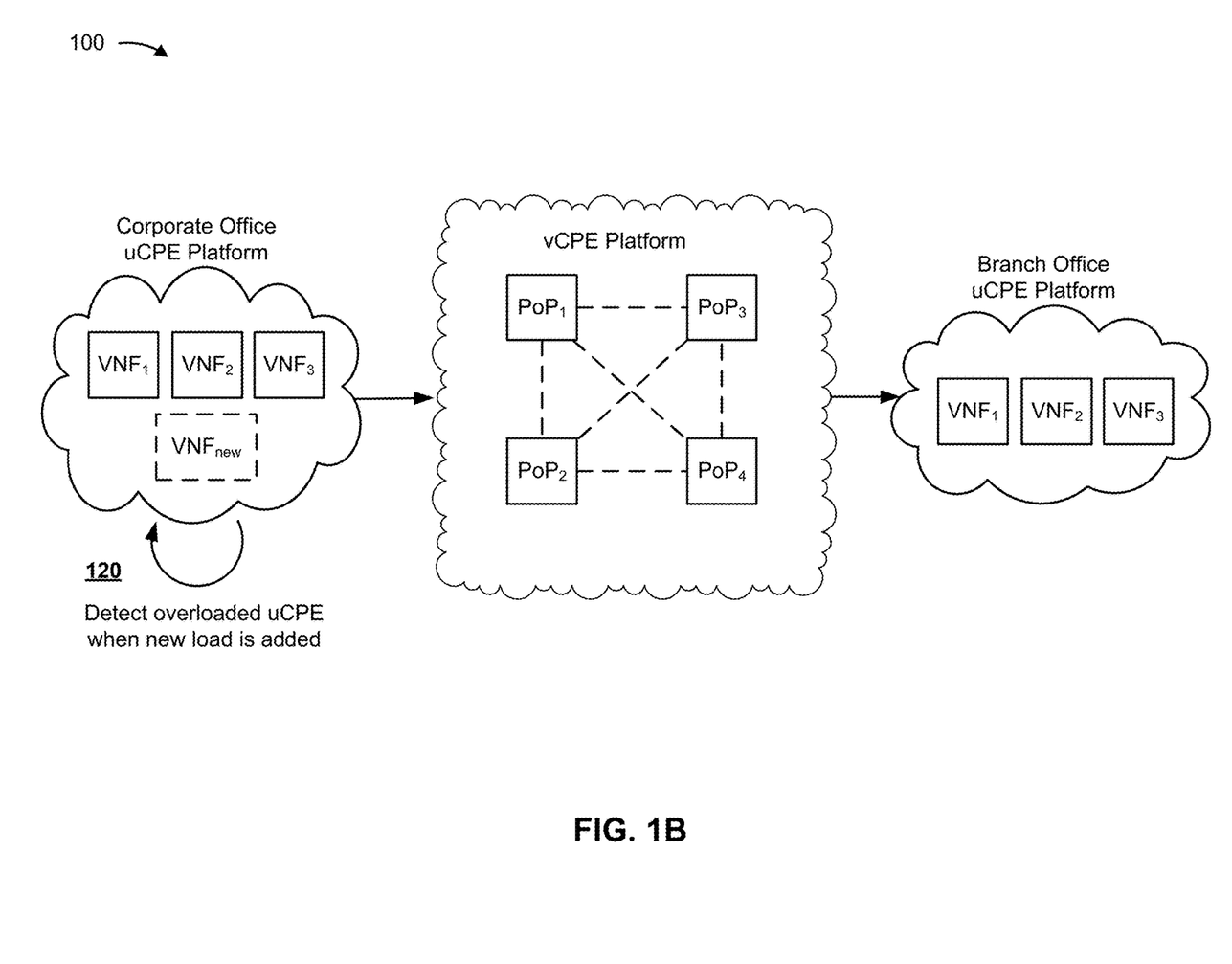
Figure 1C:
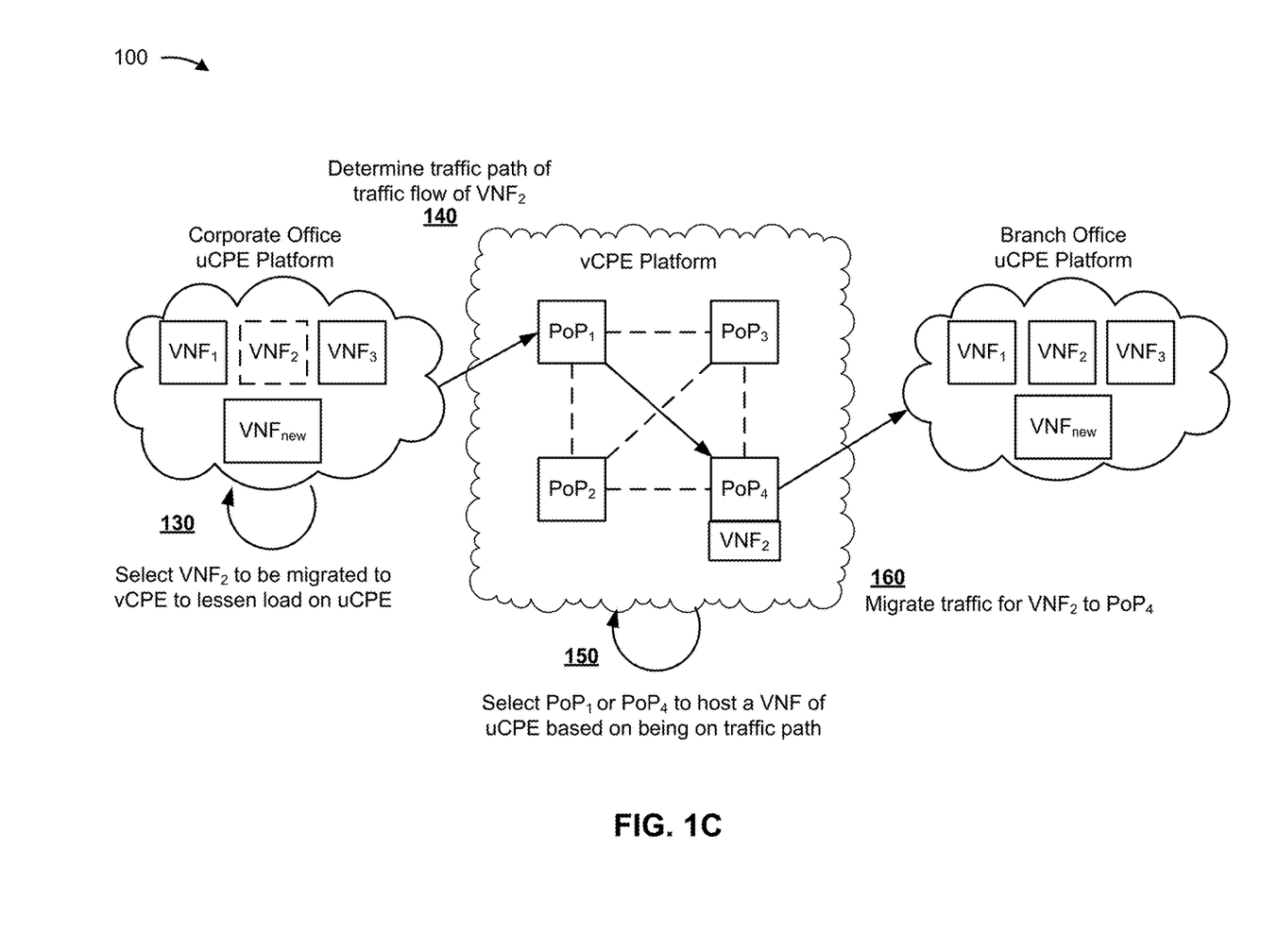

FIGS. 1A-1C are diagrams of an overview of an example implementation 100 described herein. As shown in FIGS. 1A-1C, example implementation 100 may include a corporate office uCPE platform that includes a set of VNFs (shown as $VNF_1$, $VNF_2$, and $VNF_3$), and may include a branch office uCPE platform that includes a corresponding set of VNFs (shown as $VNF_1$, $VNF_2$, and $VNF_3$). In some implementations, the corporate office uCPE platform and branch office uCPE platform may be owned by a same entity (e.g., a business, an organization, an individual, etc.) as part of a distributed NFV platform. In some implementations, the corporate office uCPE platform and branch office uCPE platform may be owned by separate entities. Example implementation 100 may also include a vCPE platform that includes multiple PoPs (shown as $PoP_1$, $PoP_2$, $PoP_3$, and $PoP_4$). In some implementations, the vCPE platform may be a platform of a same or different service provider as the service provider of the uCPE platforms.

As shown in FIG. 1A, and by reference number 110, the corporate office uCPE platform may send traffic through the vCPE platform to the branch office uCPE platform. As shown in FIG. 1B, and by reference number 120, an overloaded uCPE platform may be detected when a new load is added. For example, the corporate office uCPE platform may be detected as overloaded when $VNF_{new}$ is added to the corporate office uCPE platform, as shown. In this case, it may be determined that scaling is needed. In some implementations, it may be determined that scaling is needed when existing VNFs become overloaded (not necessarily because a new VNF was added to the uCPE platform). Additionally, or alternatively, other issues (e.g., a failure in the uCPE platform, a device shutdown in the uCPE platform, an inability to access a device of the uCPE platform, etc.) may be detected within the corporate office uCPE platform, and it may be determined that HA is needed.

As shown in FIG. 1C, and by reference number 130, a traffic flow of a VNF may be selected to be migrated to the vCPE platform to lessen or lighten the load on the corporate office uCPE platform (i.e., a cloudburst may be performed). For example, a traffic flow of $VNF_2$ may be selected to be migrated, as shown. The traffic flow of $VNF_2$ may be selected based on characteristics of the traffic flow of $VNF_2$. As shown by reference number 140, a traffic path (shown as a solid line in FIG. 1C) may be determined for the traffic flow of $VNF_2$ from the corporate office uCPE platform, through the vCPE platform, to the branch office uCPE platform.

As shown by reference number 150, a PoP may be selected along the traffic path to host a VNF to lessen a load of the corporate office uCPE platform. For example, $PoP_1$ or $PoP_4$ may be selected as candidates to host $VNF_2$ of the uCPE platform based on being on a traffic path. As shown by reference number 160, the traffic for $VNF_2$ may be migrated to $PoP_4$. $PoP_4$ may be selected based on characteristics of $PoP_1$ and/or $PoP_4$ (e.g., $PoP_4$ has more bandwidth than $PoP_1$, the utilization of $PoP_4$ relative to $PoP_1$, or the cost of migrating the traffic flow of $VNF_2$ is lower for $PoP_1$ than $PoP_4$). In this way, a selected traffic flow of a VNF may be migrated from a uCPE platform to a selected PoP, of a vCPE platform, that is along a traffic path of the traffic flow, thereby lessening the load on the uCPE platform.

In this way, a selection process may be implemented to migrate traffic from a uCPE platform to a vCPE platform that avoids overloading resources of a vCPE platform while achieving scaling and/or HA for uCPE platform. Accordingly, failures, shutdowns, errors, or the like may be avoided within a uCPE platform and/or a vCPE platform.

As indicated above, FIGS. 1A-1C are provided merely as an example. Other examples are possible and may differ from what was described with regard to FIGS. 1A-1C.

Figure 2:
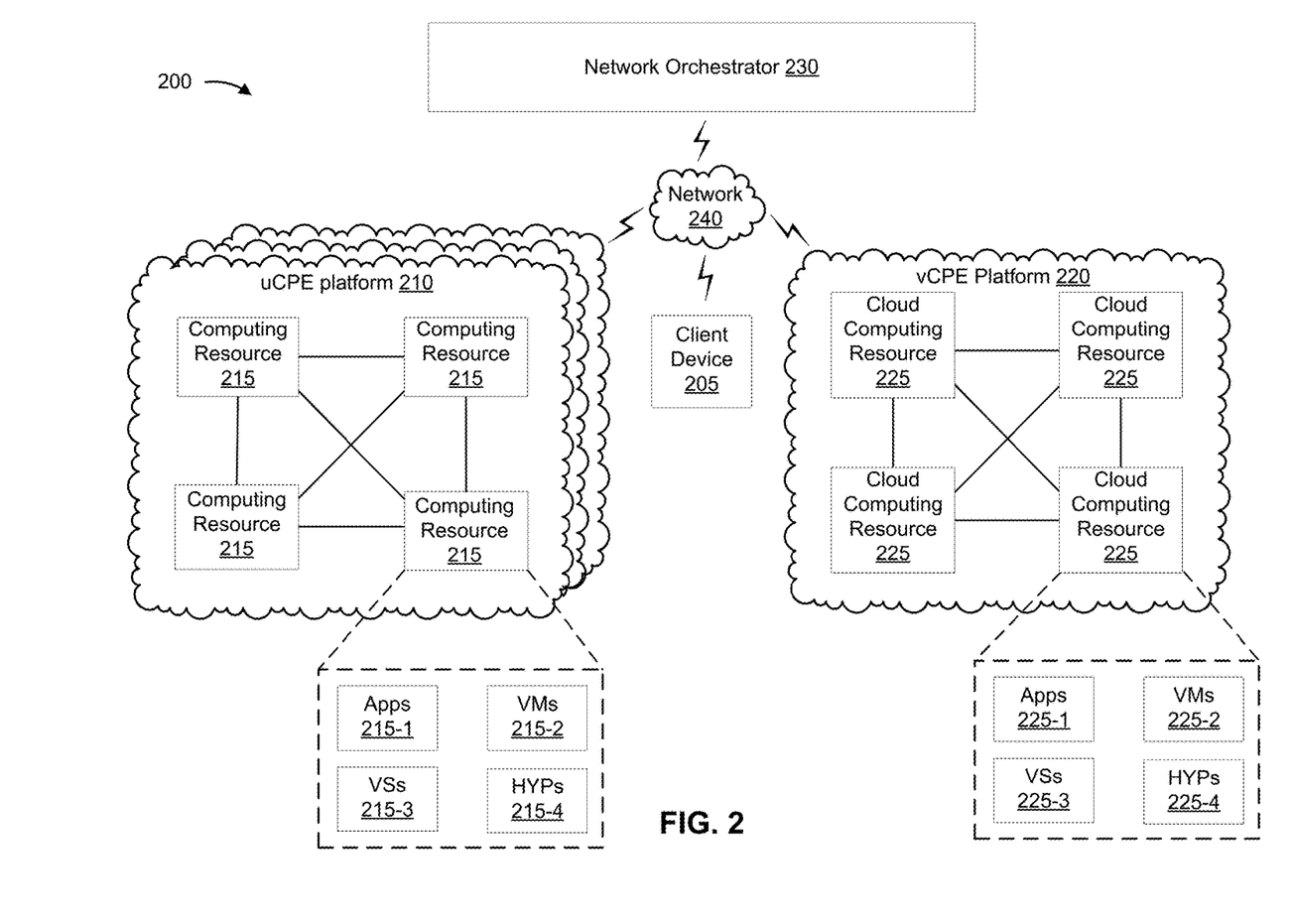
FIG. 2 is a diagram of an example environment in which systems and/or methods, described herein, may be implemented.

FIG. 2 is a diagram of an example environment 200 in which systems and/or methods, described herein, may be implemented. As shown in FIG. 2, environment 200 may include a client device 205, one or more uCPE platforms 210 (referred to herein individually as a "uCPE platform 210" and collectively as "uCPE platforms 210"), a vCPE platform 220, a network orchestrator 230, and a network 240. Devices of environment 200 may interconnect via wired connections, wireless connections, or a combination of wired and wireless connections.

Client device 205 includes one or more devices capable of receiving, generating, storing, processing, and/or providing information associated with uCPE platform 210 and/or vCPE platform 220. For example, client device 205 may include a communication and/or computing device, such as a mobile phone (e.g., a smart phone, a radiotelephone, etc.), a laptop computer, a tablet computer, a handheld computer, a gaming device, a wearable communication device (e.g., a smart wristwatch, a pair of smart eyeglasses, etc.), or a similar type of device.

In FIG. 2, uCPE platform 210 and/or vCPE platform 220 include respective environments that deliver computing as a service, whereby shared resources, services, or the like may be provided. However, uCPE platforms 210 may include on-site customer premises equipment (e.g., to implement distributed NFV), such as computing resources 215, while vCPE platform 220 may include cloud-based customer premises equipment (e.g., to implement centralized NFV), such as cloud computing resources 225. Accordingly, for example, one or more of the uCPE platforms 210 may be physically located at separate sites (e.g., corporate office locations, remote office locations, branch office locations, etc.) of an entity receiving service from a service provider, while vCPE platform 220 may be located off-site in a location, unknown to the entity, that is operated by the service provider.

As describe herein, uCPE platform 210 and/or vCPE platform 220 may provide computation, software, data access, storage, and/or other services that do not require end-user knowledge of a physical location (whether a physical location on-site for uCPE platform 210 or a physical location off-site for vCPE platform 220) and configuration of a system and/or a device that delivers the services. As shown, uCPE platform 210 may include computing resources 215 (which may be referred to herein individually as computing resource 215) and vCPE platform 220 may include cloud computing resources 225 (which may be referred to herein individually as cloud computing resource 225).

Computing resources 215 and cloud computing resources 225 (which may be referred to herein as NFV resources 215, 225) include one or more personal computers, workstation computers, server devices, or another type of computation and/or communication device. Resources of uCPE platform 210 and/or vCPE platform 220 may include compute instances executing in NFV resources 215, 225, storage devices provided in NFV resources 215, 225, data transfer devices provided by NFV resources 215, 225, or the like. In some implementations, NFV resources 215, 225 may communicate with other NFV resources 215, 225 via wired connections, wireless connections, or a combination of wired and wireless connections.

As further shown in FIG. 2, NFV resources 215, 225 may include a group of cloud resources, such as one or more applications ("APPs") 215-1, 225-1, one or more virtual machines ("VMs") 215-2, 225-2, virtualized storage ("VSs") 215-3, 225-3, one or more hypervisors ("HYPs") 215-4, 225-4, or the like, respectively.

Applications 215-1, 225-1 includes one or more software applications that may analyze files and/or that may be executed within a secure environment to test files. For example, application 215-1, 225-1 may include software associated with performing VNFs and/or any other software capable of being provided via NFV resources 215, 225. In some implementations, one application 215-1, 225-1 may send/receive information to/from one or more other applications 215-1, 225-1, via virtual machine 215-2, 225-2.

Virtual machines 215-2, 225-2 includes a software implementation of a machine (e.g., a computer) that executes programs like a physical machine. Virtual machine 215-2, 225-2 may be either a system virtual machine or a process virtual machine, depending upon use and degree of correspondence to any real machine by virtual machine 215-2, 225-2. A system virtual machine may provide a complete system platform that supports execution of a complete operating system ("OS"). A process virtual machine may execute a single program, and may support a single process. In some implementations, virtual machine 215-2, 225-2 may execute to implement a VNF. In some implementations, one virtual machine 215-2, 225-2 may cause one or more other virtual machines 215-2, 225-2 to perform a function.

Virtualized storage 215-3, 225-3 includes one or more storage systems and/or one or more devices that use virtualization techniques within the storage systems or devices of NFV resources 215, 225. In some implementations, within the context of a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the storage system flexibility in how the administrators manage storage for end users. File virtualization may eliminate dependencies between data accessed at a file level and a location where files are physically stored. This may enable optimization of storage use, server consolidation, and/or performance of non-disruptive file migrations. In some implementations, virtualized storage 215-3, 225-3 may be used to implement a VNF or may be used in association with a VNF.

Hypervisors 215-4, 225-4 provide hardware virtualization techniques that allow multiple operating systems (e.g., "guest operating systems") to execute concurrently on a host computer, such as NFV resources 215, 225. Hypervisor 215-4, 225-4 may present a virtual operating platform to the guest operating systems, and may manage the execution of the guest operating systems. Multiple instances of a variety of operating systems may share virtualized hardware resources.

Accordingly, uCPE platform 210 and/or vCPE platform 220 may serve as NFV platforms to provide VNF services for a user (e.g., a user of client device 205) and/or a service provider.

Network orchestrator 230 includes one or more devices capable of migrating traffic between uCPE platform 210 and vCPE platform 220 according to some implementations herein. In some implementations, network orchestrator 230 may be capable of handling and/or managing scaling of VNFs and/or high-availability of VNFs executing on uCPE platform 210 and/or vCPE platform 220. Additionally, or alternatively, network orchestrator 230 may monitor a load and/or an operability of uCPE platform 210 to determine whether to cloudburst traffic based on the loads and/or operability of uCPE platform 210.

Network orchestrator 230 may include a server device or group of server devices. In some implementations, network orchestrator 230 may be partially or entirely hosted within uCPE platform 210 and/or vCPE platform 220. In some implementations, network orchestrator 230 may be a physical device implemented within a housing, such as a chassis. In some implementations, network orchestrator 230 may be a virtual device implemented by one or more computer devices of a cloud computing environment or a data center.

Network 240 includes one or more wired and/or wireless networks. For example, network 240 may include a cellular network (e.g., a long-term evolution (LTE) network, a code division multiple access (CDMA) network, a 3G network, a 4G network, a 5G network, another type of next generation network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, or the like, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
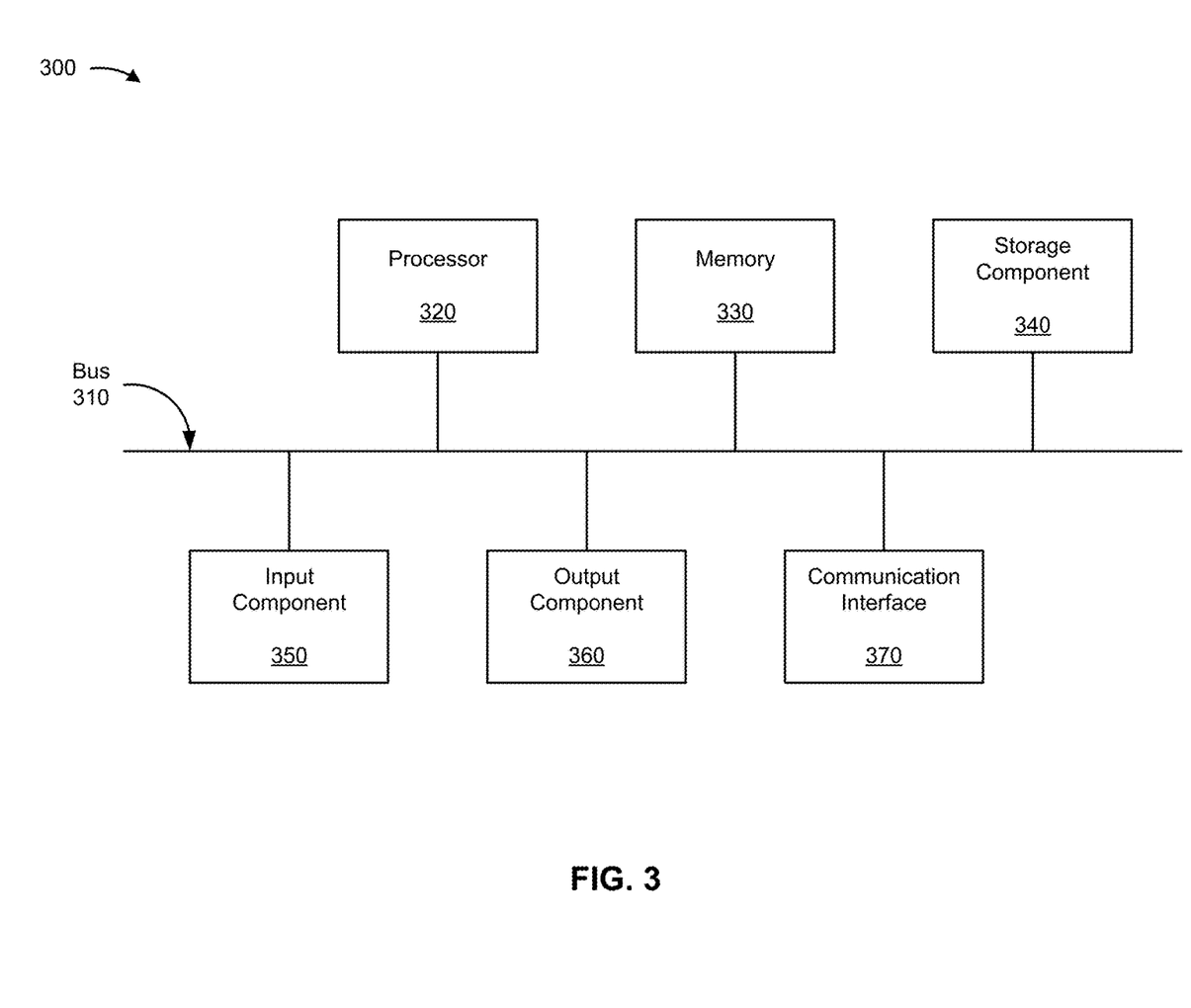
FIG. 3 is a diagram of example components of one or more devices of FIG. 2.

FIG. 3 is a diagram of example components of a device 300. Device 300 may correspond to client device 205, computing resource 215 of uCPE platform 210, cloud computing resource 225 of vCPE platform 220, and/or network orchestrator 230. In some implementations, uCPE platform 210, vCPE platform 220, and/or network orchestrator 230 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 includes a component that permits communication among the components of device 300. Processor 320 is implemented in hardware, firmware, or a combination of hardware and software. Processor 320 takes the form of a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 320 includes one or more processors capable of being programmed to perform a function. Memory 330 includes a random access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 may include a sensor for sensing information (e.g., a global positioning system (GPS) component, an accelerometer, a gyroscope, and/or an actuator). Output component 360 includes a component that provides output information from device 300 (e.g., a display, a speaker, and/or one or more light-emitting diodes (LEDs)).

Communication interface 370 includes a transceiver-like component (e.g., a transceiver and/or a separate receiver and transmitter) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, or the like.

Device 300 may perform one or more processes described herein. Device 300 may perform these processes based on processor 320 executing software instructions stored by a non-transitory computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
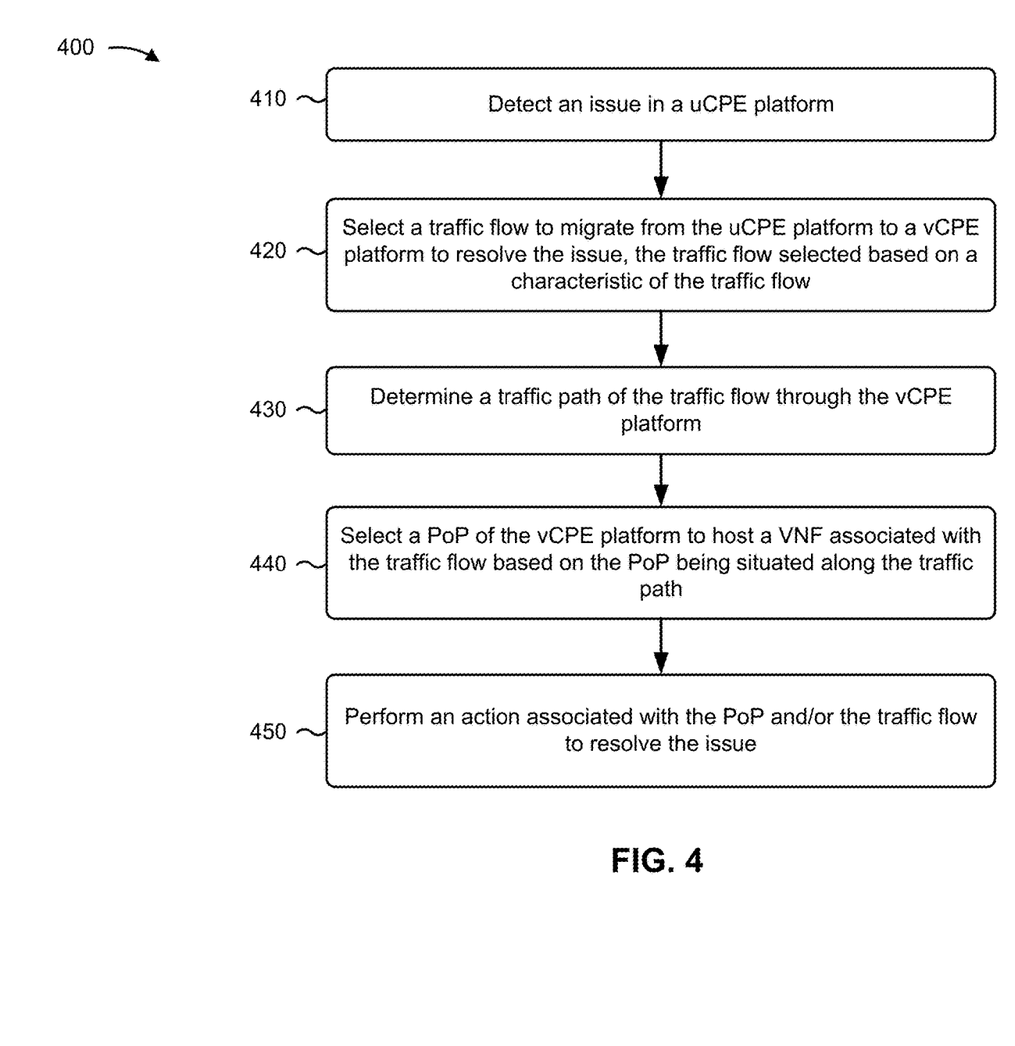
FIG. 4 is a flow chart of an example process for traffic migration based on traffic flow and traffic path characteristics.

FIG. 4 is a flow chart of an example process 400 for traffic migration based on traffic flow and traffic path characteristics. In some implementations, one or more process blocks of FIG. 4 may be performed by network orchestrator 230. In some implementations, one or more process blocks of FIG. 4 may be performed by another device or a group of devices separate from or including network orchestrator 230, such as client device 205, uCPE platform 210, and/or vCPE platform 220.

As shown in FIG. 4, process 400 may include detecting an issue in a uCPE platform (block 410). For example, network orchestrator 230 may detect the issue in uCPE platform 210. In this case, uCPE platform 210 may be a distributed NFV platform associated with on-site customer premises equipment. In some implementations, network orchestrator 230 may detect the issue based on being configured to monitor uCPE platform 210 for the issue (and/or other issues).

In some implementations, the issue may include an event (e.g., reaching a threshold load, becoming inoperable, or the like), a state of uCPE platform 210 (e.g., a state corresponding to a load of uCPE platform 210 or an operability of uCPE platform 210), and/or the like. According to some implementations, the issue may be considered to be of concern, detrimental, or harmful to the performance or capabilities of uCPE platform 210, components in communication with uCPE platform 210 (e.g., client device 205 or network orchestrator 230), or components of a network in communication with uCPE platform 210 (e.g., vCPE platform 220, network 240, etc.). In some implementations, to detect the issue, network orchestrator 230 may monitor or determine one or more appropriate load thresholds of uCPE platform 210 (e.g., a percentage of capacity used, an available bandwidth threshold, etc.) at which to perform an action to resolve the issue. Additionally, or alternatively, network orchestrator 230 may monitor or determine one or more levels of performance representative of the operability of uCPE platform 210 (e.g., corresponding to packet loss, processing speed, communication speed, responsiveness during a particular time period (which may indicate a shutdown), errors/failures encountered within a particular time period, or the like) at which to perform an action to resolve the issue.

In the case of an issue that might be resolved by scaling, for example, network orchestrator 230 may detect that the issue includes uCPE platform 210 satisfying (e.g., approaching or exceeding) a load threshold corresponding to the available bandwidth remaining for the uCPE platform (and/or the amount of load on the uCPE platform). In the case of an issue that may be resolved through HA, for example, network orchestrator 230 may detect that the issue includes an operability issue, such as the failures within uCPE platform 210, errors in uCPE platform 210, shutdowns within uCPE platform 210, disconnections within uCPE platform 210, or the like.

In some implementations, network orchestrator 230 may detect the issue by monitoring uCPE platform 210 for the issues. In some implementations, network orchestrator 230 may detect the issue based on a notification from uCPE platform 210, based on monitoring usage of uCPE platform 210, based on monitoring an available capacity of uCPE platform 210, based on monitoring operations or operability of uCPE platform 210, based on monitoring a performance level of uCPE platform 210, or the like.

In this way, network orchestrator 230 may detect an issue in a uCPE platform that may be resolved according to some implementations herein by migrating a traffic flow to a vCPE platform.

As further shown in FIG. 4, process 400 may include selecting a traffic flow to migrate from the uCPE platform to a vCPE platform to resolve the issue, the traffic flow selected based on a characteristic of the traffic flow (block 420). For example, network orchestrator 230 may select one or more traffic flows (e.g., traffic flows of one or more VNFs) to migrate from uCPE platform 210 to vCPE platform 220. In this case, vCPE platform 220 may be a centralized NFV associated with cloud-based customer premises equipment. In some implementations, network orchestrator 230 may select the traffic flow to migrate based on detecting the issue.

In some implementations, a traffic flow may be associated with VNFs, with uCPE platforms, and/or with vCPE platforms. For example, the traffic flow may come from multiple VNFs of uCPE platform 210. In this case, the traffic flow may include data associated with a service provided by a particular VNF. In various implementations, the traffic flow may include information and/or data (e.g., messages, files, image data, audio data, video data, streaming data, etc.) of an application, a virtualized storage, or any other function or service that may be implemented by a VNF.

In some implementations, migration of a traffic flow may include a VNF of vCPE platform 220 being assigned to handle the traffic flow of a VNF of uCPE platform 210. Accordingly, in this case, the VNF of vCPE platform 220 is a same type as the VNF of uCPE platform 210). Based on the migration of traffic in this way, an issue may be resolved (e.g., by scaling and/or by providing HA). In some implementations, the characteristic of the traffic flow to be migrated may include an SLA associated with the traffic flow (e.g., an SLA that indicates a performance level of the traffic flow, a preferred location that is to handle the traffic flow (e.g., uCPE platform 210 or vCPE platform 220), a priority associated with the traffic flow (e.g., a priority relative to other traffic flows of uCPE platform 210), a destination of the traffic flow (e.g., location (e.g., physical or logical within a network topology of environment 200), destination type, and similar corresponding characteristics (e.g., destination SLA, destination priority, or the like) of the destination), a quantity of traffic in the traffic flow relative to quantities of traffic in other traffic flows, and/or the like.

In some implementations, network orchestrator 230 may compare characteristics of the traffic flows from uCPE platform 210 when selecting a traffic flow. For example, network orchestrator 230 may identify the characteristics of a first traffic flow, compare that characteristic to a same characteristic of other traffic flows of uCPE platform 210, and select the traffic flow based on the characteristics of the traffic flow and the respective characteristics of the other traffic flows.

In this way, network orchestrator 230 may select an appropriate traffic flow that is to be migrated from the uCPE platform to an appropriate PoP of the vCPE platform to resolve the issue.

As further shown in FIG. 4, process 400 may include determining a traffic path of the traffic flow through the vCPE platform, and to a destination (block 430). For example, network orchestrator 230 may determine the traffic path. In some implementations, network orchestrator 230 may determine the traffic path of the traffic flow based on the traffic flow being selected for migration to vCPE platform 220. In some implementations, network orchestrator 230 may determine the traffic path of the traffic flow based on the traffic path being established in a network (e.g., uCPE platform 210 and/or vCPE platform 220) monitored by network orchestrator 230, based on network orchestrator 230 being activated or configured to monitor the traffic path or other traffic paths, based on network orchestrator 230 being powered on, based on network orchestrator 230 being placed in communication with uCPE platform 210 and/or vCPE platform 220, based on network orchestrator 230 receiving instructions to determine the traffic path and/or monitor the traffic path, or the like.

According to some implementations, the traffic path corresponds to a route that the traffic flow takes from uCPE platform 210, through vCPE platform 220 (e.g., from PoP to PoP of vCPE platform 220), and to the destination. For example, when determining the traffic path through vCPE platform 220, network orchestrator 230 may identify a plurality of PoPs along the traffic path of the traffic flow. In such an example, the plurality of PoPs may be candidates to host VNFs of the traffic flow in the event of a cloudburst of the traffic flow. Accordingly, to cloudburst the traffic flow, network orchestrator 230 may select one of the plurality of PoPs to host a VNF of the traffic flow.

In some implementations, the traffic path and/or destination may include physical locations and/or logical locations within a topology of a network. Accordingly, the traffic path may define a physical route (e.g., through a geographical region) from uCPE platform 210, to physical locations of PoPs of vCPE platform 220, and to the physical location of the destination. Additionally, or alternatively, the traffic path may define a logical route (e.g., through a topology of a network) from uCPE platform 210, through PoPs of vCPE platform 220, and to the destination. In some implementations, the destination may be another uCPE platform 210. In some implementations, the traffic path may be associated with particular services, VNFs, communication links, a co-owned source and destination, or the like.

In this way, network orchestrator 230 may determine a traffic path through a vCPE platform that may be used for migration of traffic flows associated with the traffic path upon detection of an issue in the uCPE platform.

As further shown in FIG. 4, process 400 may include selecting a PoP of the vCPE platform to host services associated with the traffic flow based on a characteristic of the PoP (block 440). For example, network orchestrator 230 may select the PoP to host the VNF associated with the traffic flow. In some implementations, network orchestrator 230 may select the PoP based on detecting the issue in uCPE platform 210 and/or selecting the traffic flow to migrate to vCPE platform 220.

In some implementations, a PoP may include a demarcation point or interface point between communicating entities. In this case, the selected PoP may be part of vCPE platform 220. For example, the selected PoP may be located geographically throughout a region of a service provider (e.g., a state, a country, the world, etc.).

In some implementations, the VNF may correspond to a VNF of a uCPE platform 210 that is providing the traffic. In some implementations, the same VNFs may be located on PoPs throughout vCPE platform 220. In some implementations, multiple VNFs may be selected on multiple different PoPs.

In some implementations, by selecting a PoP that is situated on the traffic path (e.g., as compared previous techniques of selecting a PoP that has been designated or that is closest to a uCPE platform 210 providing and/or receiving the traffic), network orchestrator 230 maintains an expected performance level (e.g., speed, efficiency) as the selected PoP is located on the traffic path that may have been determined to be optimal (e.g., network orchestrator 230, an administrator of environment 200, etc.) for that traffic flow (i.e., traffic flow is not rerouted off the traffic path to another PoP).

In some implementations, network orchestrator 230 may select the PoP based on a number of characteristics. For example, PoPs along the traffic path may be identified (e.g., as candidates for migration), and analyzed based on characteristics, including the destination of the traffic flow, utilization of the PoP, load of the PoP, cost of sending the traffic from uCPE platform 210 to the PoP. According to some implementations, the PoP may be selected based on the utilization (e.g., traffic handling capabilities, VNFs or VNF types available on the PoP, etc.) and/or the load of the PoP relative to loads of other PoPs along the traffic path and/or a cost of migrating the traffic flow to the PoP relative to costs of migrating the traffic flow to other PoPs along the traffic path. Accordingly, the PoP may select which of the PoPs of vCPE platform 220 along the traffic path are to handle the migrated traffic from uCPE platform 210 based on characteristics of the PoPs along the traffic path.

In this way, network orchestrator 230 may select an appropriate PoP that is to host a VNF to handle the traffic flow without losing performance and/or expending costs.

As further shown in FIG. 4, process 400 may include performing an action associated with the PoP or the traffic flow to resolve the issue (block 450). For example, network orchestrator 230 may perform the action. In some implementations, network orchestrator 230 may perform the action based on the PoP and/or the traffic flow being selected for migration.

In some implementations, the action may include migrating the traffic flow from uCPE platform 210 to the PoP of vCPE platform 220. For example, network orchestrator 230 may facilitate deactivating a VNF of uCPE platform 210 handling the selected traffic flow and activating a VNF of the selected PoP of vCPE platform 220 to handle the traffic flow. In some implementations, network orchestrator 230 may instruct uCPE platform 210 to deactivate a VNF of the traffic flow and instruct the PoP of vCPE platform 220 to host or activate a VNF to handle the traffic flow. Additionally, or alternatively, network orchestrator 230 may provide routing and/or re-routing instructions such that the selected traffic flow is to be routed to/from a VNF of the selected PoP of vCPE platform 220 rather than a VNF of uCPE platform 210.

In some implementations, performing an action associated with the traffic flow and/or PoP may include sending a notification of a migration of the traffic flow from uCPE platform 210 to the PoP of vCPE platform 220. For example, network orchestrator 230 may notify a user (e.g., via a user interface of client device 205), devices (e.g., client device 205, other PoPs of vCPE platform 220) and/or platforms (e.g., other uCPE platforms 210, vCPE platform 220) that the selected traffic flow is to be migrated from uCPE platform 210 to the selected PoP of vCPE platform 220.

In some implementations, performing an action associated with the traffic flow or the PoP may include requesting confirmation or authorization to cloudburst or migrate the traffic flow from uCPE platform 210 to the PoP of vCPE platform 220, and/or the like. For example, network orchestrator 230 may prompt a user (e.g., via a user interface of client device 205) to acknowledge (e.g., accept, authorize, verify, confirm, etc.) that the selected traffic flow is to be migrated from uCPE platform 210 to the selected PoP of vCPE platform 220.

In this way, network orchestrator 230 may perform an action to resolve the issue in the uCPE by facilitating migration of one or more traffic flows from the uCPE to the vCPE.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

Figure 5:
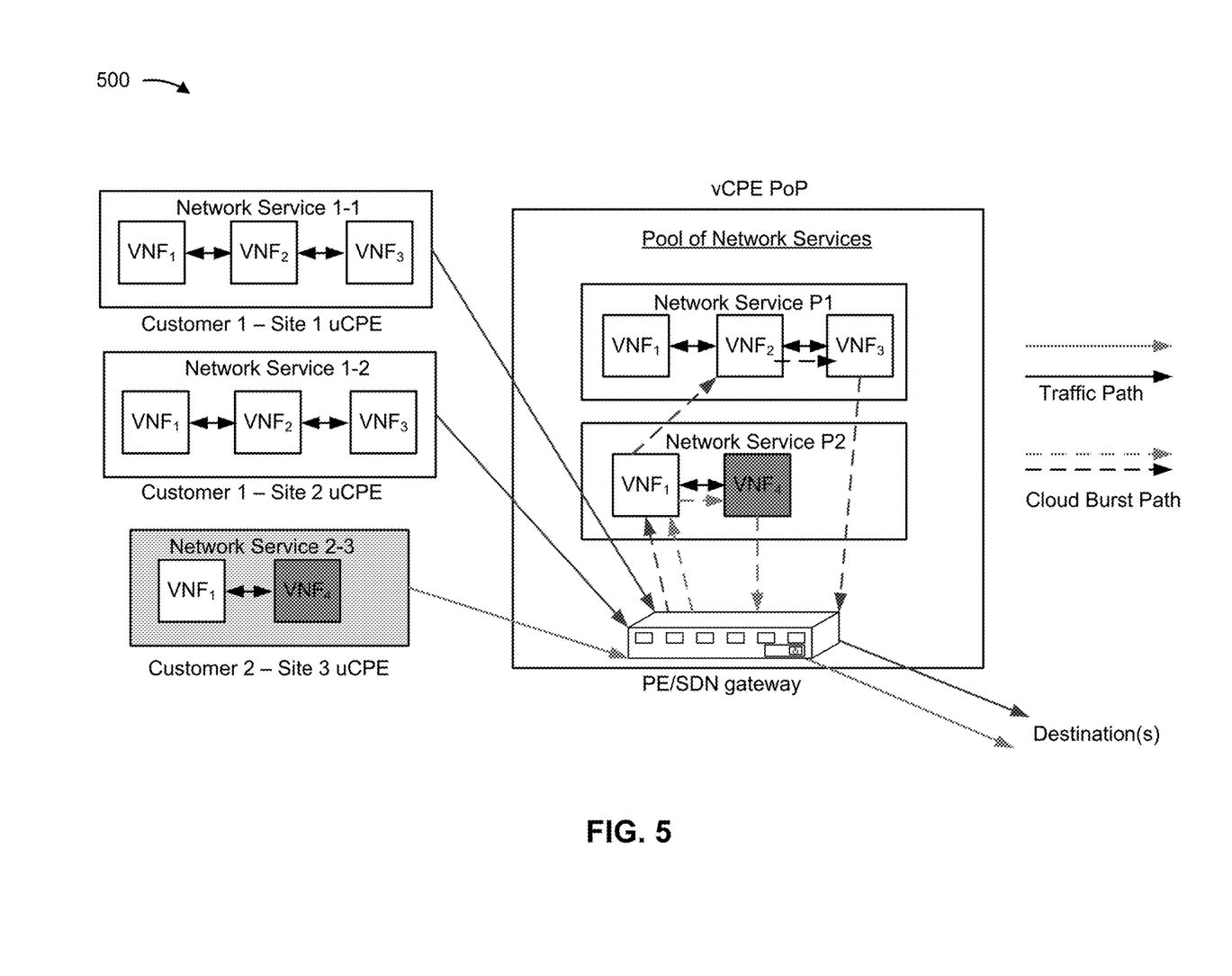
FIG. 5 is a diagram of an example implementation relating to the example process shown in FIG. 4.

FIG. 5 is a diagram of an example implementation 500 relating to example process 400 shown in FIG. 4. FIG. 5 shows an example of a migration from a uCPE platform (e.g., uCPE platform 210) to a PoP of a vCPE platform (e.g., vCPE platform 220). In the example shown in FIG. 5, the migration may be implemented such that different uCPE platforms and/or customers may access a same pool of network services P1, P2 of a PoP of vCPE platform.

As shown in FIG. 5, example implementation 500 includes two customers. Customer 1 has site 1 uCPE platform and site 2 uCPE platform and customer 2 has site 3 uCPE platform. In this case, customer 1 uCPE platforms include a network service 1-1 and a network service 1-2, respectively, associated with $VNF_1$, $VNF_2$, and $VNF_3$, and the customer 2 uCPE platform includes a network service 2-3 associated with $VNF_1$ and $VNF_4$.

As further shown in FIG. 5, example implementation 500 includes a vCPE PoP that includes a pool of network services, and a provider edge/software defined network (PE/SDN) gateway. In this case, the pool includes a first network service associated with $VNF_1$, $VNF_2$, and $VNF_3$, and a second network service associated with $VNF_1$ and $VNF_4$.

In example implementation 500, for customer 1, as shown by solid dark gray lines, traffic paths of respective traffic flows of network services 1-1, 1-2 go from the site 1 uCPE platform and site 2 uCPE platform, respectively, to the PE/SDN gateway and onto the destinations. In the example of FIG. 5, for customer 2, as shown by solid light gray lines, a traffic path of a traffic flow of network service 2-3 goes from the site 3 uCPE platform to the PE/SDN gateway and onto the destinations. However, in the event of a cloudburst, for customer 1, as shown by dashed dark gray lines, the traffic paths of network services 1-1, 1-2 reroute to the PoP of the vCPE platform. As shown, for a customer 1 cloudburst, $VNF_1$ of network service P2 handles the $VNF_1$ traffic flows and $VNF_2$ and $VNF_3$ of network service P1 handle the $VNF_2$ and $VNF_3$ traffic flows. Furthermore, for a cloudburst of customer 2 traffic, as shown by dashed light gray lines, traffic is rerouted to the PoP of the vCPE platform, and $VNF_1$ and $VNF_4$ service network P2 handle the $VNF_1$ and $VNF_4$ traffic flows.

In order to perform the above cloudbursts (or migrations), a network orchestrator (e.g., network orchestrator 230) may send a packet, with a tunnel header and a service chain context, to the PE/SDN gateway. The PE/SDN gateway may receive the packet, remove the tunnel header, and send the packet to a virtual router (VRouter) that translates the service chain context to a VNF virtual local area network (VLAN) and routes the packets between the VNFs, as shown, such that the packet is processed in the specific service chain context.

As indicated above, FIG. 5 is provided merely as an example. Other examples are possible and may differ from what was described with regard to FIG. 5.

Figure 6:
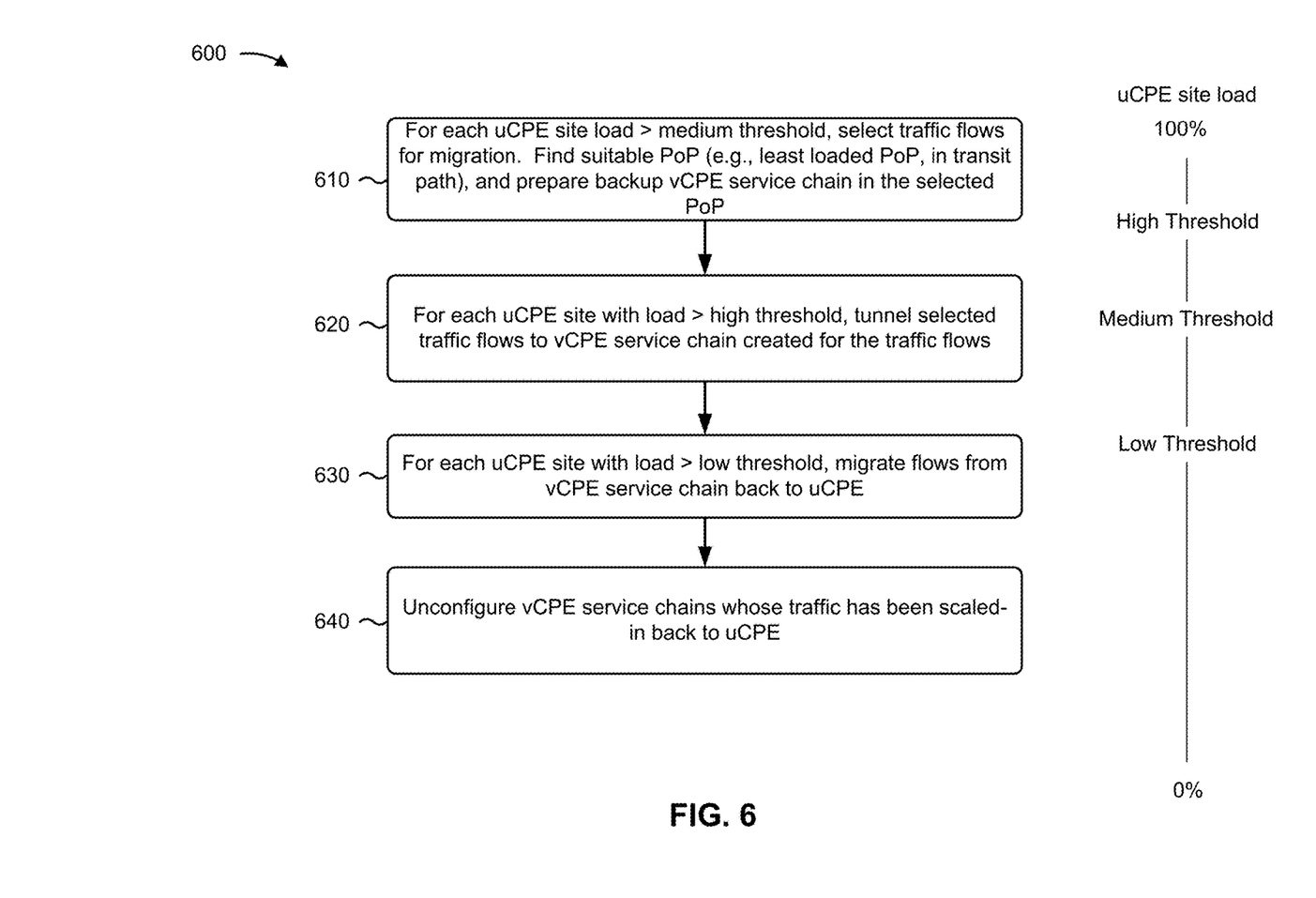
FIG. 6 is a diagram of an example implementation relating to the example process shown in FIG. 4.

FIG. 6 is a diagram of an example implementation 600 relating to example process 400 shown in FIG. 4. FIG. 6 shows an example of traffic migration based on traffic flow and traffic path characteristics.

As shown in FIG. 6, traffic flows may be determined (e.g., by network orchestrator 230) based on an extent of uCPE platform site load. For example, a medium threshold may represent a site load that is greater than a low threshold (e.g., relative to a 100% full capacity site load), and a high threshold may represent a site load that is greater than the medium threshold (e.g., relative to a 100% full capacity site load).

As shown in FIG. 6, example implementation 600 may include, for each uCPE site with a load that satisfies a medium threshold, selecting traffic flows for migration, and identifying a suitable PoP (e.g., a least loaded PoP, in a transit path), and preparing a backup vCPE service chain in the selected PoP (block 610). For example, network orchestrator 230 may select traffic flows for migration from uCPE platform 210, identify a suitable PoP of vCPE platform 220, and prepare a backup vCPE service chain in the selected PoP.

As further shown in FIG. 6, example implementation 600 may include, for each uCPE site with a load that satisfies a high threshold, tunneling selected traffic flows to a vCPE service chain created for the traffic flows (block 620). For example, network orchestrator 230 may tunnel selected traffic flows to a vCPE service chain in vCPE platform 220 created for the traffic flows.

As further shown in FIG. 6, example implementation 600 may include, for each uCPE site with a load that satisfies a low threshold, migrating traffic flows from a vCPE service chain back to the uCPE (block 630). For example, network orchestrator 230 may migrate traffic flows from a vCPE service chain back to the uCPE.

As further shown in FIG. 6, example implementation 600 may include dismantling vCPE service chains whose traffic has been scaled in back to the uCPE (block 640). For example, network orchestrator 230 may dismantle vCPE service chains whose traffic has been scaled in back to the uCPE. As indicated above, FIG. 6 is provided merely as an example. Other examples are possible and may differ from what was described with regard to FIG. 6.

Some implementations herein enable migrating appropriate traffic flows of uCPE platforms to appropriate resources of vCPE platforms. For example, traffic flows of applications may be selected for migration based on characteristics of the traffic flows and/or characteristics of the corresponding applications of the traffic flows, such as an application's service level agreement (SLA), a priority of an application, a destination path for traffic flow of an application, or the like. As another example, a particular point of presence (PoP) of a vCPE platform may be selected for migration based on characteristics of the PoP, including a destination (e.g., a physical location, a logical location within a topology of a network, etc.) of the traffic, a utilization of the PoP, a cost of migrating a traffic flow from the uCPE to the PoP, or the like. Accordingly, a selection process may be implemented to migrate traffic from a uCPE platform to a vCPE platform that avoids overloading resources of a vCPE platform while achieving scaling and/or HA for uCPE. Accordingly, failures, shutdowns, errors, or the like may be avoided within a uCPE platform and/or a vCPE platform.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, and/or a combination of hardware and software.

Some implementations are described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, etc.

Certain user interfaces have been described herein and/or shown in the figures. A user interface may include a graphical user interface, a non-graphical user interface, a text-based user interface, etc. A user interface may provide information for display. In some implementations, a user may interact with the information, such as by providing input via an input component of a device that provides the user interface for display. In some implementations, a user interface may be configurable by a device and/or a user (e.g., a user may change the size of the user interface, information provided via the user interface, a position of information provided via the user interface, etc.). Additionally, or alternatively, a user interface may be pre-configured to a standard configuration, a specific configuration based on a type of device on which the user interface is displayed, and/or a set of configurations based on capabilities and/or specifications associated with a device on which the user interface is displayed.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A device comprising:
a memory; and
one or more processors to:
    detect an issue in a universal customer premises equipment (uCPE) platform;
    select a traffic flow to migrate from the uCPE platform to a virtual customer premises equipment (vCPE) platform,
        the traffic flow being selected based on a characteristic of the traffic flow;
    determine a traffic path of the traffic flow through the vCPE platform;
    identify a plurality of points of presence of the vCPE platform along the traffic path;
    select a point of presence (PoP) from the plurality of points of presence, based on a characteristic of the PoP and on the PoP being situated along the traffic path, to host a virtual network function (VNF) associated with the traffic flow; and
    perform an action associated with the PoP or the traffic flow to resolve the issue.

2. The device of claim 1, where the one or more processors, when detecting the issue, are to:
monitor a load of the uCPE platform; and
detect the issue when the load of the uCPE platform satisfies a load threshold of the uCPE platform,
    the action being performed to enable scaling for services of the uCPE platform.

3. The device of claim 1, where the one or more processors, when detecting the issue, are further to:
monitor an operability of the uCPE platform; and
detect the issue based on a level of performance corresponding to the operability of the uCPE platform.

4. The device of claim 1, where the characteristic of the traffic flow comprises at least one of:
a service level agreement of the traffic flow,
a priority associated with the traffic flow, or
a destination of the traffic flow.

5. The device of claim 1, where the characteristic of the PoP comprises at least one of:
a load of the PoP,
a utilization of the PoP, or
a cost of migrating the traffic flow to the PoP.

6. The device of claim 1, where the one or more processors, when performing the action, are to:
migrate the traffic flow from the uCPE platform to the PoP of the vCPE platform by instructing the PoP to host the VNF.

7. A non-transitory computer-readable medium storing instructions, the instructions comprising:
one or more instructions that, when executed by one or more processors, cause the one or more processors to:
    detect an issue in a universal customer premises equipment (uCPE) platform based at least in part on monitoring the uCPE platform for an event corresponding to the issue,
        the event comprising at least one of the uCPE platform reaching a threshold load or becoming inoperable;
    select a traffic flow to cloudburst from the uCPE platform to a virtual customer premises equipment (vCPE) platform,
        the traffic flow being selected based on a characteristic of the traffic flow;
    determine a traffic path of the traffic flow through a plurality of points-of-presence (PoPs) of the vCPE platform;
    select a PoP from the plurality of PoPs to host a virtual network function (VNF) associated with the traffic flow; and
    perform an action associated with the PoP or the traffic flow to resolve the issue.

8. The non-transitory computer-readable medium of claim 7, where the one or more instructions, that cause the one or more processors to select the traffic flow, cause the one or more processors to:
identify the characteristic of the traffic flow relative to corresponding to a same characteristic of other traffic flows of the uCPE platform; and
select the traffic flow based on the characteristic of the traffic flow and the characteristic of the other traffic flows,
    where the characteristic includes at least one of:
        a service level agreement,
        a priority, or
        a destination.

9. The non-transitory computer-readable medium of claim 7, where the one or more instructions, that cause the one or more processors to select the PoP from the plurality of PoPs, cause the one or more processors to:
determine a characteristic associated with the PoP; and
select the PoP based on the characteristic associated with the PoP relative to respective characteristics of one or more of the plurality of PoPs.

10. The non-transitory computer-readable medium of claim 9, where the characteristic comprises at least one of:
a utilization of the PoP,
a load of the Pop, or
a cost of migrating the traffic flow to the PoP.

11. The non-transitory computer-readable medium of claim 7, where the one or more instructions, that cause the one or more processors to perform the action, cause the one or more processors to:
cloudburst the traffic flow by migrating the traffic flow from the uCPE platform to the PoP of the vCPE platform.

12. The non-transitory computer-readable medium of claim 7, where the one or more instructions, that cause the one or more processors to perform the action, cause the one or more processors to:
request, via a user interface, authorization to cloudburst the traffic flow from the uCPE platform to the PoP of the vCPE platform.

13. A method, comprising:
detecting, by a device, an issue in a universal customer premises equipment (uCPE) platform;
selecting, by the device, a traffic flow of a virtual network function (VNF) of the uCPE platform to migrate to a virtual customer premises equipment (vCPE) platform,
    the traffic flow being selected based on a characteristic of the traffic flow;
determining, by the device, a traffic path of the traffic flow from the uCPE platform, through the vCPE platform, and to a destination;
selecting, by the device, a point of presence (PoP) of the vCPE platform to host a VNF corresponding to the VNF of the uCPE platform to handle the traffic flow,
    the PoP being selected based on the PoP being situated along the traffic path, and where selecting the PoP comprises:
  identifying a plurality of PoPs along the traffic path; and
  selecting the PoP from the plurality of PoPs based on a characteristic of the PoP,
  the characteristic comprising at least one of:
    a utilization of the PoP,
    a load of the PoP, or
    a cost of migrating the traffic flow to the PoP; and
performing, by the device, an action associated with the PoP or the traffic flow to resolve the issue.

14. The method of claim 13, where detecting the issue, comprises:
  detecting the issue based on the uCPE platform being at least one of overloaded or inoperable.

15. The method of claim 13, where the characteristic of the traffic flow comprises at least one of a service level agreement of the traffic flow, a priority of an application of the traffic flow, or a destination path of the traffic flow.

16. The method of claim 13, where performing the action comprises:
  migrating the traffic flow from the uCPE platform to the selected PoP.

17. The method of claim 13, where performing the action comprises:
  sending a notification associated with migrating the traffic flow from the uCPE platform to the selected PoP.

18. The device of claim 1, where the one or more processors are further to:
  select the PoP based on the characteristic associated with the PoP relative to respective characteristics of one or more of the plurality of PoPs.

19. The device of claim 1, where detecting the issue comprises:
  detecting the issue based on the uCPE platform being at least one of overloaded or inoperable.

20. The method of claim 13, where the characteristic further includes at least one of:
  a service level agreement,
  a priority, or
  a destination.

* * * * *